United States Patent [19]

Johnson

[11] 3,947,990
[45] Apr. 6, 1976

[54] SUBMERSIBLE FLOAT
[76] Inventor: Donald K. Johnson, 16380 Terry Lane, Oak Forrest, Ill. 60452
[22] Filed: Apr. 10, 1975
[21] Appl. No.: 566,884

[52] U.S. Cl............................... 43/44.9; 43/43.15
[51] Int. Cl.².......................................... A01K 93/00
[58] Field of Search............... 43/44.9, 44.91, 43.15

[56] References Cited
UNITED STATES PATENTS

| | | | |
|---|---|---|---|
| 1,991,253 | 2/1935 | Kerns | 43/43.15 |
| 2,241,367 | 5/1941 | Sarff | 43/43.15 X |
| 2,498,815 | 2/1950 | McVay | 43/44.9 X |
| 2,722,769 | 11/1955 | Blockinger, Sr. et al. | 43/44.91 |
| 2,952,937 | 9/1960 | Wassing | 43/43.15 |

Primary Examiner—Louis G. Mancene
Assistant Examiner—Daniel J. Leach

[57] ABSTRACT

A device for imparting buoyancy to a fish hook and attached bait comprising a two part capsule having a passageway therein for firmly holding the shank of a fish hook and for passage of the connecting fish line through the capsule. The device is constructed such that the fish line passes through the center of the capsule so that the buoyant forces are centered on the line which connects the fish hook to a sinker weight.

9 Claims, 3 Drawing Figures

SUBMERSIBLE FLOAT

BACKGROUND OF THE INVENTION

The present invention relates to the art of fishing and, more particularly, to the field of recreational fishing and provides a submersible float capsule for imparting buoyancy to a fish hook.

As is well known in the art of fishing, lead weights or sinkers are commonly attached to a fish line and the hook is attached to a leader affixed to the line at a location such that the hook is approximately 6 inches to 3 feet from the sinker. The distance between the sinker and the fish hook is calculated such that the fish hook will be a preselected distance above the bottom of the body of water when the sinker weight rests on the bottom. There are known float devices attached to fish lines to impart buoyancy to the fish hook and bait attached thereto but some of the known devices suffer from the disadvantage that they must be attached to one side of the line which connects the weight to the hook resulting in possible interference of the hook with the line to which it is attached and entanglment. Devices for imparting buoyancy to fish hooks should be readily detachable from the fish line and relatively inexpensive since such devices are frequently lost if the fish line breaks.

SUMMARY OF THE INVENTION

With above disadvantages of the prior art in mind, it is an object of the present invention to provide a submersible float capsule for attachment to a fish hook and connecting line which will firmly hold the shank of the fish hook in a relationship such that it is aligned with the connecting fish line to avoid entanglement of the fish line and hook portion of the fish hook or bait attached thereto.

It is a further object of the present invention to provide a submersible float capsule arrangement constructed of a minimum number of parts so that the float capsule can be economically constructed.

A further object of the invention is to provide a submersible float which can be readily attached to and detached from the fish hook and line.

It is a further object of the present invention to provide a submersible float capsule device which, when attached to a fish hook which is in turn attached to the fish line, will conceal the knot connecting the fish line to the fish hook to prevent interference of the knot with sharp or abrasive bottom objects such as rocks, sharp weeds and the like.

The present invention accordingly provides a submersible float capsule device for imparting buoyancy to a fish hook attached to a fish line, said capsule device comprising: a base, said base including a generally disc-shaped pedestal having a column extending upwardly from the center thereof, said column having an axially extending passageway therein, said pedestal having a peripheral recess providing a supporting flange defining a seat peripherally extending around the pedestal on the side thereof from which said column extends from said pedestal; and a cover, said cover having a skirt portion received in said recess and supported on said flange in said seat and a dome portion having an aperture therein receiving an upper terminal end of said column, said cover portion and said base portion, in assembled relationship, being substantially fluid tight to provide a buoyant capsule for floatingly supporting an attached fish hook.

With the above objectives in mind, a preferred embodiment of the present invention will now be described with specific reference to the accompanying drawings.

DETAILED DESCRIPTION OF THE INVENTION

Figure 1:
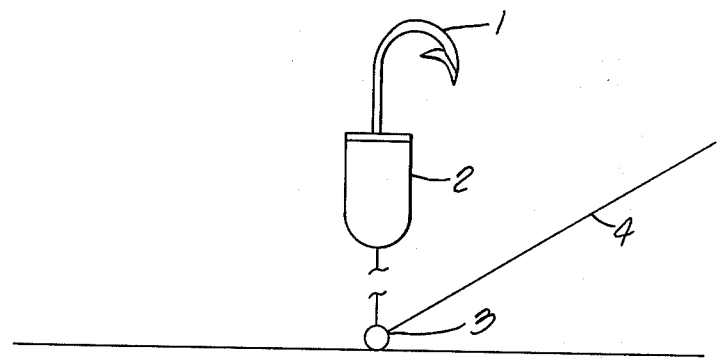
FIG. 1 is a perspective view showing the manner of attachment of the submersible float capsule of the present invention to the hook and fish line.

As shown in FIG. 1, a fish hook 1 is attached to submersible float capsule 2 of the present invention. The assembly of hook and capsule is connected to a sinker weight 3 which rests on the bottom of the body of water being fished and connected to a fish line 4. The distance at which the sinker 3 is located from the hook 1 is selected by the fisherman to insure that the fish hook and related bait will float above debris, weeds, mud or other undesirable conditions existing on the bottom of the body of water being fished and at a depth at which fish customarily travel or feed.

Figure 2:
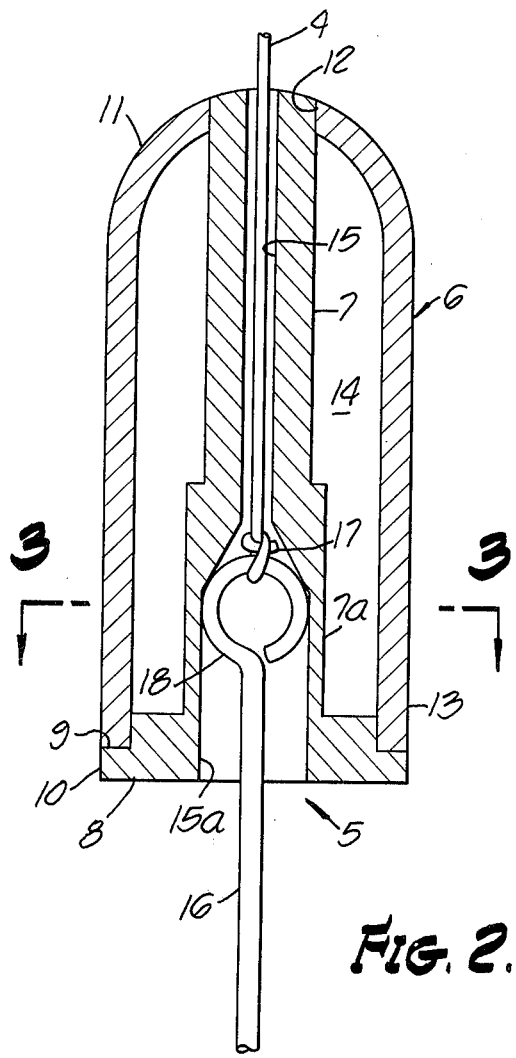
FIG. 2 is a sectional elevation showing the two parts of the capsule of the present invention in assembled relationship.

In FIG. 2, the float capsule 2 of the present invention is shown to comprise a base 5 and cover 6. The base 5 is comprised of an upstanding column 7 which extends vertically from a disc-shaped pedestal 8. The pedestal 8 has a notch 9 in the upper peripheral surface extending completely therearound to provide a flange 10 or seat for receiving the bottom end of the cover 6. The cover 6 is a generally cylindrical member having a dome 11 provided with an aperture 12 in the center thereof for reception of the top end of the column 7 and a depending skirt portion 13. The two parts 5,6 of the float capsule are each preferably constructed of a suitable plastic material, although conceivably other materials would work as well. In order to provide suitable transparency such that the float capsule is substantially invisible to the fish in the water, the parts are preferably made from a clear or opaque plastic such as polypropylene or a product marketed by the Phillips Petroleum Company identified in the trade as KRO 3.

When the capsule parts 5,6 are assembled together as shown in FIG. 2, the top end of the column 7 closely seals the aperture 12 in the dome 11 with a tight frictional fit and the lower end or skirt portion 13 of the cover 6 is sealingly supported with a tight frictional fit on the flange 10 of the base 5. Such a construction enables air to be entrapped in the space 14 between the cover 6 and base 5 such that the entire device, when assembled to a hook 1, will impart buoyancy thereto.

The column 7 has a vertical bore 15 extending completely therethrough and has an enlarged portion 15a at the bottom of the bore 15 which portion 15a is preferably tapered at the top for receiving and firmly holding the eye portion 18 and shank 16 of the hook 1. The overall effect of this construction insures that the knot 17 connecting the hook 1 to the fish line 4 is received in the enlarged portion 15a of the bore 15 such that the knot 17 is somewhat protected and thus unlikely to come undone.

Figure 3:
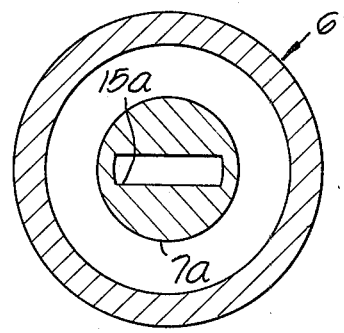
FIG. 3 is a cross section along the lines 3—3 of FIG. 2.

As best seen in FIG. 3, enlarged portion 15a of bore 15 is elongated for reception of eye 18 of fish hook 1 to hold the hook 1 with a tight frictional fit. For structural rigidity column 7 is suitably thickened at 7a in the region surrounding enlarged portion 15a of bore 15.

It has been found that the construction of the present invention does not require fluid seals between the mating surfaces at flange 10 of the base 5 and lower end 13 of cover 6 and at dome 11 and column 7 provided that the parts are made of suitable plastic and are molded to suitable tolerances. Thus, a tight friction fit is all that is necessary to maintain the parts 5,6 of the submersible float capsule 2 in assembled airtight relationship. It will be appreciated, however, that a suitable adhesive agent could also be used if desired. Without adhesive, the two parts 5,6 of the capsule can be manually disassembled to release any entrapped water which may accumulate in space 14 during use of the device. No other known submersible float devices have this capability.

In order to assemble the float capsule 2 to the hook 1 and fish line 4, it is simply necessary to thread the fish line 4 through the bore 15 in the column 7 of the base 5 until it extends from the bottom of the capsule at which time a suitable knot 17 connecting the fish line 4 to the hook 1 is made. Excess fish line 4 is then cut off and the line 4, with attached hook 1, is pulled back up through the float capsule so that the shank 16 of the fish hook 1 is firmly wedged in the enlarged area 15a of bore 15.

Since the fish line 4 and shank 16 of the fish hook 1 are received in a bore 15 which extends symmetrically through the float capsule 2, the shank 16 of fish hook 1 and fish line 4 will always be aligned with each other, the capsule 2 will be unlikely to interfere or become entangled with the attached fish line, and the assembly of hook 1 and capsule 2 will be floatingly supported above the sinker 3 at a selected location from the sinker 3 depending on the location of the sinker 3 on the line 4.

While there has been described herein a preferred embodiment of the invention, it will be appreciated that minor departures and modifications from the preferred embodiment can be made from the invention without departing from the coverage of the enclosed claims which define the scope of protection.

I claim:

1. A submersible float capsule device for imparting buoyancy to a fish hook attached to a fish line, said capsule device comprising: a base; said base including a generally disc-shaped pedestal having a column extending upwardly from the center thereof, said column having an axially extending passageway therein, said pedestal having a peripheral recess providing a supporting flange defining a seat peripherally extending around the pedestal on the side thereof from which said column extends from said pedestal; and a cover, said cover having a skirt portion received in said recess and supported on said flange in said seat and a dome portion having an aperture therein receiving an upper terminal end of said column, said cover portion and said base portion, in assembled relationship, being substantially fluid tight to provide a buoyant capsule for floatingly supporting an attached fish hook.

2. A float capsule device according to claim 1 wherein said passageway in said column has an enlarged portion at the end thereof adjacent to said pedestal, said enlarged portion being dimensioned for receiving the shank and firmly holding an attached eye of a fish hook with a tight frictional fit.

3. A float capsule according to claim 2 wherein said enlarged portion of said column passageway is provided in a thickened portion of said column adjacent said pedestal.

4. A float capsule device according to claim 3 wherein said base and cover are assembled in said fluid-tight relationship by a friction fit between the mating surfaces of said cover and base where said aperture in said dome contacts the upper end of said column and where said skirt portion of said cover contacts said pedestal.

5. A float capsule device according to claim 4 wherein said mating surfaces of the cover and base are adhesively bonded to each other.

6. A float capsule device in combination with a fish hook and leader attached thereto, said float capsule device being frictionally affixed to the fish hook and surrounding a shank portion of the hook, said leader being tied with a knot to an eye portion of said fish hook at the end of said shank, said float capsule device concealing said knot and imparting buoyancy to said hook and leader.

7. The combination of claim 6 wherein said float capsule device is made of a substantially transparent plastic material.

8. The combination of claim 6 wherein said float capsule device comprises: a base; said base including a generally disc-shaped pedestal having a column extending upwardly from the center thereof, said column having an axially extending passageway therein, said pedestal having a peripheral recess providing a supporting flange defining a seat peripherally extending around the pedestal on the side thereof from which said column extends from said pedestal; and a cover, said cover having a skirt portion received in said recess and supported on said flange in said seat and a dome portion having an aperture therein receiving an upper terminal end of said column, said cover portion and said base portion, in assembled relationship, being substantially fluid tight.

9. The combination of claim 8 wherein said shank portion of said fish hook is received in an enlarged portion of said passageway and said eye portion of said fish hook is firmly held in said enlarged portion of said passageway with a tight frictional fit.

* * * * *